P. Roche,
Sharpening Rotary Saws.
N° 56,100. Patented July 3, 1866.

Witnesses:
Theodore B. Schenck
F. A. Durken

Inventor:
Phillip Roche

UNITED STATES PATENT OFFICE.

PHILLIP ROCHE, OF BINGHAMTON, NEW YORK.

IMPROVED SAW-GUMMER.

Specification forming part of Letters Patent No. 56,100, dated July 3, 1866.

*To all whom it may concern:*

Be it known that I, PHILLIP ROCHE, of Binghamton, in the county of Broome, in the State of New York, have invented a new and Improved Mode of Gumming Saws; and I do hereby declare that the following is a full, clear, and exact description of the same, reference being had to the annexed drawings, making a part of this specification, in which—

Figure 1:
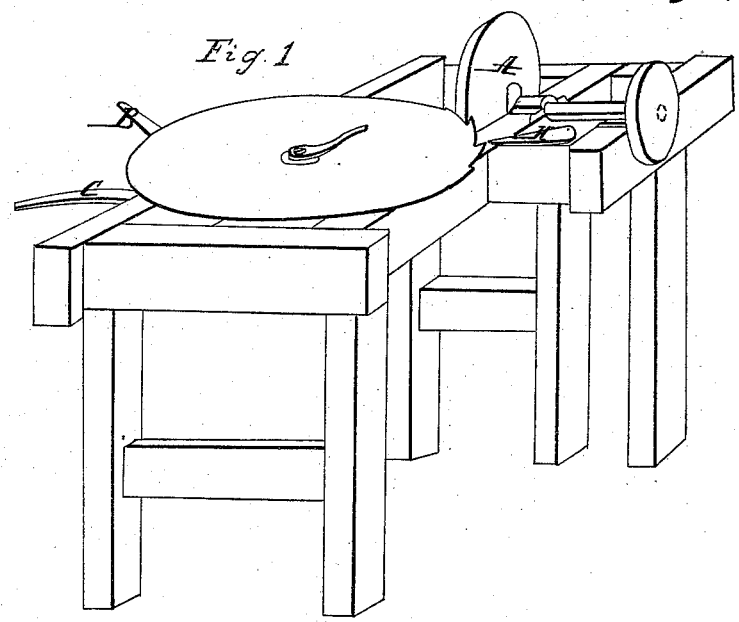
Figure 2:
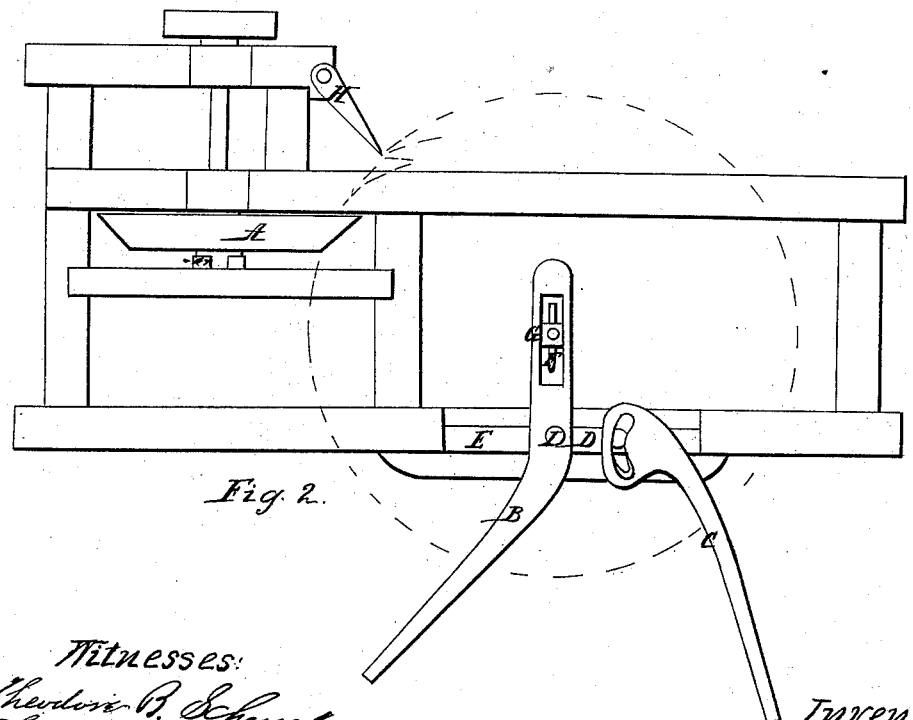

Figure 1 is a perspective view of the apparatus constructed according to my improvement. Fig. 2 is a plan of the same with the saw-plate removed.

Like letters represent like parts in the figures.

My invention consists in the construction of a saw-gummer for circular or other saws, which I believe to be more simple and efficient than those hitherto made for that purpose, being more readily manipulated and producing more accurate and satisfactory work.

My improvement may be attached to the ordinary circular-saw frame, or, when it is necessary to construct it in a more permanent manner, a frame made after the form of the model may be used, which is similar in its construction to those in ordinary use.

The fulcrum I of the adjustable lever B is attached to the sliding block D, which works in the slot E on the side of the frame. The sliding block is operated by means of the eccentric lever C. The slot F in the end of the adjustable lever B is for the purpose of adjusting the saw-plate to the proper length, depth, pitch, and form of the tooth.

When the saw-plate is ready for cutting the teeth it is secured in its position by means of the screw and nut on the upper end of the center pin, G. This keeps it in place while the tooth is being cut. The depth and form of the tooth is now entirely dependent upon the movement of the adjustable lever B.

The indicator H is placed near the stone A, and is attached to the frame by means of a screw passing through a slot in the end. This slot is for the purpose of moving it to correspond with the wear of the stone. The stone A is attached to the frame in a similar manner to that of the ordinary circular saw.

When I attach my improvement to the common circular-saw frame I first remove the saw from the mandrel and place in its stead the stone; then secure it by means of the same nut and washer. I then attach the indicator and the longitudinal side piece in which the sliding block D and the levers B and C work. It is then ready for operation. This is a simple and convenient arrangement, to be used when there is no stationary frame-work.

When I use my improvement I first place the saw-plate upon the center pin, G, and if it is necessary to true down the edge to a broken tooth I move up the eccentric lever C to the proper place, then loosen up the nut on said center pin so that the plate will revolve freely upon it. I then put the stone in motion and move the plate around by the hand until it is trued. It is now ready for cutting the teeth. I now screw down the nut on the end of the center pin, for the purpose of securing the saw-plate from moving upon it during the operation of cutting the teeth, as it is now only to be moved upon the fulcrum of the adjustable lever B. I then take hold of the eccentric lever C with the right hand, and move up the sliding block D to its proper position, and hold it there, while I manipulate the lever B with the left hand until the tooth is ground to its desired form. I then place the indicator-point near the edge of the plate and on a line with that part of the tooth which is soon to become its point; then loosen up the plate and turn it on its center to the right the distance cut away. I then again screw down the nut, and cut it down until it reaches the point of the indicator, and so on until the work is finished. This obviates the necessity of spacing and marking the teeth, which in the ordinary method of gumming it is necessary to do.

What I claim as my invention, and desire to secure by Letters Patent, is—

The combination and arrangement of the adjustable lever B, sliding block D, eccentric lever C, and indicator H, substantially as described, and for the purposes set forth.

PHILLIP ROCHE.

Witnesses:
THEODORE B. SCHENCK,
F. A. DUNKER.